Nov. 4, 1969  E. R. PELTA  3,477,024
CAPACITIVE PROBE
Filed Aug. 8, 1966
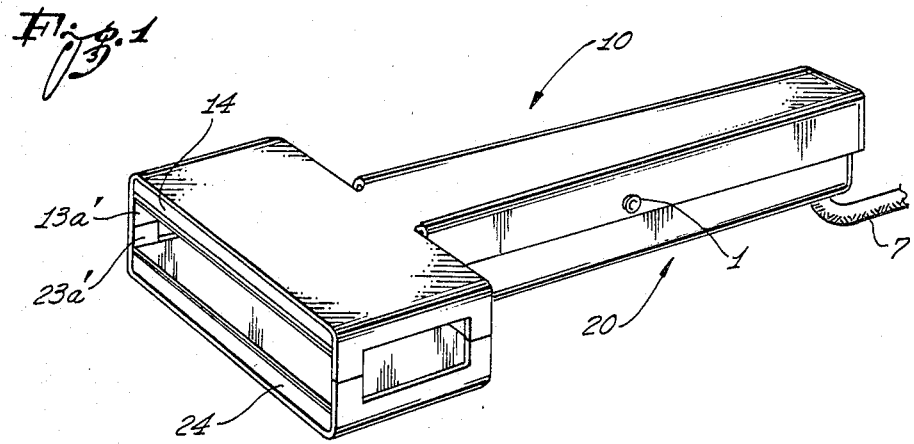
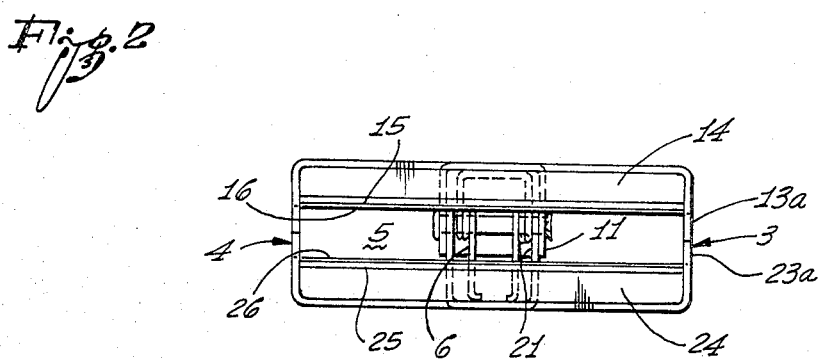
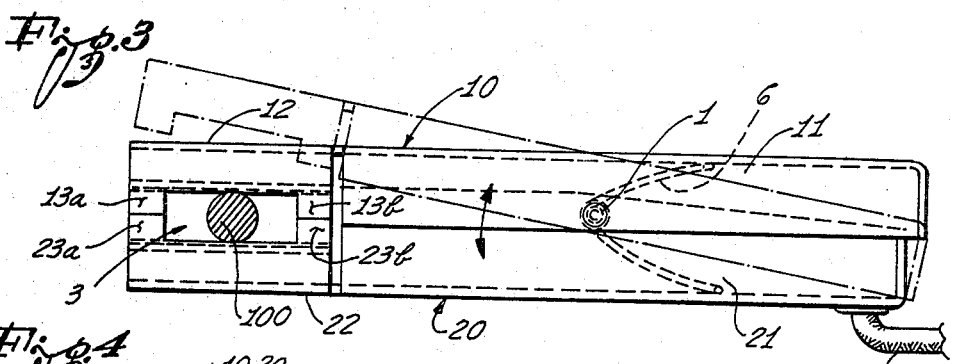
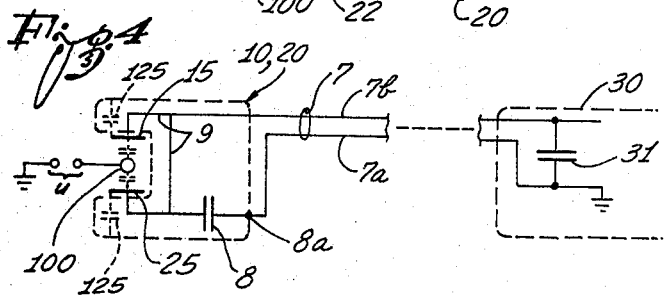
INVENTOR:
Edmond R. Pelta
ATTORNEYS United States Patent Office 3,477,024
Patented Nov. 4, 1969

3,477,024
CAPACITIVE PROBE
Edmond R. Pelta, Pacific Palisades, Calif., assignor to Autoscan, Inc., Culver City, Calif., a corporation of California
Filed Aug. 8, 1966, Ser. No. 570,891
Int. Cl. G01r 31/02
U.S. Cl. 324—126                                    8 Claims

ABSTRACT OF THE DISCLOSURE

A capacitor probe is disclosed for deriving a measuring voltage from a conductor. The probe has two pivotable handles serving as support for two capacitor plates or electrodes covered as to the surface facing a conductor by a high dielectric layer. The handles have windows for placing and retaining a cable in particular position to the capacitor plates and for position the plates in particular distance from each other and in plane parallel position to each other. The electrodes are electrically interconnected and a capacitor connects them to the handles. The measuring voltage is taken from between the handles and the interconnected electrodes.

---

The present invention relates to a capacitive probe of the type which permits measuring the voltage potential of a cable which is insulated from its environment so that the conductive element proper, such as the metallic conductor, is not directly accessible for tapping. In many cases it is not permissible to remove the insulation so that the electric conditions of the cable must be monitored through the insulation. A capacitive probe usually comprises electrode means which are positioned in relation to the cable to define therewith a particular capacitance. The measuring system is completed in that the measuring unit to which the probe is connected has a return path which is common to the return path of the electric circuit to which the cable pertains. This way a complete circuit is defined which upon proper calibration permits measuring of, for example, the voltage in the cable at the point of sensing by the probe.

Conventional capacitive probes are, however, designed in a way which does not permit the probe itself to be grounded, which means that an operator can handle the capacitive probe safely only when insulation is ensured. This however would still not be sufficient. If the main body of the probe cannot have ground potential, it must not only be insulated in relation to parts usually touched by the person handling the probe, but it must be prevented that the probe while handled or attached to the cable, touches any grounded element. If such cannot be avoided, then it is necessary to electrically insulate the entire probe. If now for reasons of a particular use of the probe it becomes very likely that that insulation on the probe chips or wears off, the problem of restriction as to the parts the probe can contact arises promptly.

The capacitive probe in accordance with the present invention is now designed so that its main body components are grounded and, therefore, does not need insulation, may be touched by the operator, may be comprised of exposed metallic parts, and may contact any grounded parts. The probe comprises two handles interconnected in a manner so as to resemble a pair of tongues. The handles can thus be pivoted towards each other and define, at the one end of each handle, a common flat measuring cavity. The cavity has two registering windows for traversal by a cable the voltage of which is to be measured.

Means are provided to define the particular size of the cavity. Two electrode plates are mounted in the cavity, one on each handle, but in insulated relationship thereto. The electrode plates are positioned in plane parallel relation to each other, to receive the cable running therethrough in similar relationship. The two capacitor plates are interconnected electrically and the electrical connection leads to one of the output wires of a pair of output conductors of the probe. The other one of the pair of output conductors is directly connected electrically to the handles, and is provided for connection to ground, for example, in the instrument portion of the measuring equipment to which the probe pertains.

In order to prevent arcing between the electrodes and the handles, it is advisable to insert additionally a capacitor of, for example 1000 picofarads, between the interconnected capacitor electrodes and the handles, the capacitor to be positioned inside of the probe. In case a high frequency signal runs through the cable, arcing could possibly occur if the capacitance defined by the capacitor electrodes and the metallic elements constituting the handles, has insufficient capacity to hold temporarily a high charge. The additional capacitor increases the effective capacitance as between handles and electrodes.

The probe is operated in that the handles are pivoted and the cable is then inserted laterally into the cavity. Release of the handles causes a spring to place the handles back into the normal position whereby a definite distance between the capacitor electrodes is provided in relation to each other, and the cable is positioned parallel to either electrode thereby impliedly defining a particular distance as between either of the capacitive electrodes and the cable.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGURE 1 illustrates in perspective view a capacitive probe in accordance with the preferred embodiment of the present invention;

FIGURE 2 illustrates a front elevation of the capacitive probe;

FIGURE 3 illustrates a side elevation of this capacitive probe; and

FIGURE 4 illustrates an equivalent circuit of this probe together with additional circuitry involved in the utilization of such a probe.

Proceeding now to the detailed description of the drawings, there is shown in several views an example for a capacitive probe which is the principal subject matter of the present invention. This capacitive probe is basically comprised of two supporting elements or handles 10 and 20 made of metal and each having an overall T-shaped configuration. The two handles are interconnected by a bolt 1 or a pair of pivot rivets to establish the structure resembling a clamp.

The top handle 10 has a handle portion proper designated by reference numeral 11. This handle portion 11 constitutes the stem of the above mentioned T and is contiguous with a plate 12, which is the "cross bar of the T." The bottom handle 20 has a stem portion 21 and a "cross bar" plate 22. The terms "top" and "bottom" are used here only for convenience of reference. During operation the probe may have any orientation and position. The two stems or handle portions 11 and 21 each have a U-shaped cross section, but the U established by the handle portion 11 is somewhat wider so that it can receive the upwardly extending side walls of handle 21. Thereby the two handle portions 11 and 21 define an elongated cavity traversed by the bolt 1 and capable of receiving, for example, a spring 6 to define and maintain a particular angular position of the two handles 10 and 20 in relation to each other. Any swivel motion of the two parts 10 and 20 in relation to each other and about the axis of the pivot pin 1 has to be carried out in opposition to the force exerted by spring 6 upon the two handles.

The sides of the two cross plates 12 and 22 each are bent towards each other to thereby define a cavity 5. The bent-around portions of plate 12, in addition, have legs or extremities on each side, such as 13a and 13b on one side and leg 13'a on the other side; a second leg on the latter other side is not visible in either drawing, but its position is readily apparent from the structure as shown because symmetry wherever feasible has been observed. There are respectively oppositely oriented legs or extremities 23a, 23b and others, on the plate 22. The spring 6 biases the handles into a position so that the downwardly directed edges of legs 13a and 13b respectively engage with and rest on the upwardly directed edges of legs 23a and 23b. Thereby a window such as 3 is defined having an orientation which is perpendicular to the planes of predominant extensions of the two plates 12 and 22.

There is a window 4 defined by similar extremities or legs extending from the respective other ends of the plates 12 and 22. The two windows 3 and 4 register in direction of the pivot axis of the two handles. The inner surface of plate 12 bears an insulating plate 14, and the inner surface of the plate 22 bears an insulating plate 24. On each of these two insulating plates there is mounted a capacitor electrode so that there are two capacitor electrodes 15 and 25 extending in a plane parallel relationship to each other when the handles have the position as normally established by spring 6, which will be called also the closed position of the probe. The capacitor electrodes are covered with an insulating layer, there being insulating layers 16 and 26 accordingly. The two capacitor electrodes 15 and 25 are thus insulated from the metallic handles. The layers 16 and 26 may be flush with the respective upper and lower edges of windows 3 and 4, so that layers 16 and 26 are apart by the height of the windows, provided, of course, the probe is closed.

As can be seen best from FIGURE 1 there is additionally a front window defined by the thin edges of the insulating plates 14 and 24 which window extends at right angles to the windows 3 and 4 and to the stems of the T's but is parallel to the axis 1. Thus, one can look into the cavity 5 from the front of the probe (view of FIGURE 2), however the cavity could be closed here. This aspect is quite immaterial, but it should be noted, that leaving this front open is simpler from the standpoint of manufacturing.

The two capacitor electrodes are electrically interconnected which is shown only schematically in FIGURE 4, and it is undertsood that this electrical connection is attained by means of a wire which is, for example, located in the interior cavity as defined by the handles 11 and 21. In FIGURE 4 the wire 9 symbolically represents this interconnection of the two capacitor plates 15 and 25. The handle elements 10 and 20 are additionally connected electrically to the ground wire 7a of a cable 7 with the aid of which the probe connects to electrical circuitry which is responsive to the measuring values detected by the probe. The interconnected electrodes 15 and 25 furthermore are connected to the signal line 7b of cable 7. One can see, that actually the electrodes 15 and 25 can be interconnected by splitting the end of wire 7b into two branch lines individually connected to the electrodes 15 and 25 in which case a separate wire such as 9 is not needed as an actual element.

A capacitor 8 is housed in the interior space as defined by the two handles 11 and 21. This capacitor 8 is electrically connected between the lines 7a and 7b, or between wire 9 and cable wire 7a, or between one of the interconnected capacitor electrodes and one of the handles, which are interconnected electrically as well as mechanically by pin 1.

In order to use the probe for measurement, the operator will press the handles at the lower portion of the T-stem and thereupon plates 12 and 22 spread apart; particularly legs 13a and 23a (and 13'a and 23'a) disengage for a distance at least equal to the thickness of a cable 100. The cable 100 is now slid laterally past the legs 13a, 23a, etc. and into space between layers 16 and 26. The legs such as 13b and 23b do not separate for the same distance as legs 13a and 23a, so that cable 100 cannot slide past legs 13b and 23b, even though they are somewhat separated. Thereafter, the probe closes in that the operator permits the spring 6 to relax into the normal position. Cable 100 is now received by the cavity 5 and runs through windows 3 and 4. Thus, cable 100 is juxtaposed to electrodes 15 and 25 over a distance given by the distance between the two windows 3 and 4. Even though the cable may run loosely through the windows, the configuration of the windows 3 and 4 retains the cable in the cavity 5.

The cable 100 when so positioned now has a particular relationship to the electrodes 15 and 25. The conductor in the cable 100 will approximately be spaced equidistantly from either of the two electrodes 15 and 25 to establish thereby two capacitors as schematically shown in FIGURE 4. The one capacitor is defined between the wire or wires in the cable 100 and the plate 15; the other capacitor is defined between the wire or wires of the cable 100 and the plate 25.

The two capacitances are determined by the distance this cable wire has from the electrode plate 15 on one hand, and from the electrode plate 25 on the other hand. The areas of the electrodes 15 and 25 are similar and the cable areas facing the two electrodes are likewise similar. Additionally these two capacitances are determined by the dielectric constant of the layers 16 and 26 and the respective thickness thereof, and by the dielectric constant of the insulation of cable 100. One will choose a rather high dielectric constant for the material of layers 16 and 26 so that the basically unknown dielectric constant of the insulation of cable 100 does not materially influence the overall dielectric constant of the capacitances.

As a first order approximation one can say that these capacitances vary in opposite direction but for equal magnitudes if, for example, for reasons of irregularities or irregular spacing or even because of a loose fitting of the cable in the windows, the wire in cable 100 is closer to the plate 15 than it is to the plate 25 (or vice versa). However, within this first order approximation one can say that the resultant total capacitance as defined by the electrically interconnected electrodes 15 and 25, on one hand, and by the wire in cable 100 on the other hand, is independent from the particular position the cable 100 has in respect to either electrode plate. This is particularly so if the dielectric constant of the layers 16 and 26 is relatively high.

When the operator releases the handles the spring 6 causes the legs 13a and 23a and others to re-engage so that the cable 100 is now trapped in the cavity. If the strength of the cable so permits, the probe can actually be hung on the cable, and the operator may release the probe entirely. This may be of advantage if the operator now has to manipulate the measuring instrument 30 to which the probe is connected. These instruments are of no concern here and may vary, depending upon the nature of the circuit to which the cable 100 pertains. In general it can be assumed that the measuring instrument 30 includes a relatively large capacitor 31 (or capacitor bank) which is of importance for the features to be described next.

In the probe, there are effective residual or parasitic capacitances denoted with reference numeral 125, and which are established by the electrodes 15 and 25 individually on one hand, and the handles 10 and 20 on the other hand. As was mentioned earlier the capacitor 8 is connected to be effective between the electrodes 15 and 25 and the grounded handles 10 and 20; the latter condition is symbolically shown at 8a in FIGURE 4. This capacitor 8 is of particular protective importance for the probe.

The operating voltage U to be measured extends, of course, between the cable 100 and ground or any other suitable reference potential which one can regard as ground potential. As stated earlier, the measuring equipment, such as symbolically denoted with reference number 30 and to which the probe is connected by cable 7, will contain the relatively large capacitance 31. The probe capacitances defined by the electrodes 15 and 25 and by cable 100 are connected in series with capacitor 31 and in the circuit which is established as follows: cable 100, the probe, the cable 7, the measuring equipment 30, ground, and the driving source U. On the other hand, the parasitic capacitances 125 are in parallel to capacitor 31 at the location of the probe.

Assuming that capacitor 8 were not used, then in case of a very high voltage surge in cable 100 there will occur very large values of $du/dt$ indicative of strong high frequency components in the cable. The capacitances as set up by the electrodes of the probe relative to cable 100 and the parasitic capacitances 125 now establish a high frequency short circuit of the cable 100 to ground. True, the predominant capacitance in series with the probe-cable 100 capacitances is the capacitor 31, but the propagation time of signals between the probe and the measuring equipment 30 cannot be neglected. Due to this finite propagation time through the cable 7 and for a surge having, temporarily at least, a large amount of high frequency components, the capacitive short circuit may well lead to arcing across parasitic capacitances 125, i.e., between one or both of the electrodes 15 and 25 and points of close proximity to the handles. The capacitor 8 now is provided to eliminate this capacitive short circuit, and it has a value considerably larger than the residual or parasitic capacitance 125. Capacitor 8 constitutes a portion of the capacitance 31 of the measuring equipment, but is located in the immediate vicinity of the probe. Capacitor 8 is located in the cavity as established by the handles 11 and 21 to be available right at the capacitive probe itself in order to prevent any capacitive short circuit of the type described. One could place the entire capacitance 31 of the measuring unit into the probe, but this is impractical as the space available in the probe is quite limited.

This inherent or parasitic capacitance 125 could be diminished by covering the entire probe with a thick layer of high dielectric material so that any metallic contact between it and any conductor at ground potential is prevented. It must be observed, however, that this probe may be used under rather rugged operating conditions so that such insulation may well be abraded or wear off. On the other hand it is of distinct advantage with regard to the ease of handling this probe that it may be made of metal with exposed surfaces, which also makes the probe more economical. By including now this capacitor 8 in the interior of the body of the probe the latter can be at ground potential and can be handled manually without danger to personnel.

The invention is not limited to the embodiment described above but all changes and modifications thereof not constituting departures from the spirit and scope of the invention are intended to be included.

I claim:
1. A capacitive probe comprising:
a pair of flat electrodes;
supporting means for the electrodes including a pair of pivotally interconnected handles;
insulating means substantially enveloping the individual electrodes for individually mounting the electrodes to the handles, the electrodes having a substantially plane parallel relationship in a first pivot position of the handles out of which plane parallel position the electrodes recede to a larger distance from each other upon actuation of the handles by pivoting, the handles further including stopper means for defining the first position and the distance of the electrodes from each other in their first position, there being a space in between the electrodes as mounted to the handles by the insulating means, for receiving a conductor in substantially parallel and not necessarily equidistant relationship to either and both of said electrodes;
means for deriving a first measuring common potential from the pair of electrodes; and
means for deriving a second reference potential from said handles.
2. A probe as set forth in claim 1, there being a capacitor mounted to said handles and electrically interconnected in between said two means for deriving potentials.
3. A capacitor probe comprising:
a first flat capacitor electrode and a second, similarly shaped capacitor electrode;
first means supporting the electrodes in variable position relation, for positioning the first and second electrodes in a plane parallel position so that the electrdoes are spaced apart by a predetermined distance from each other;
second means included in the first means for positioning a cable in relation to the first and second electrodes so that a particular portion of the cable runs substantially parallel to the two electrodes, to respectively define two capacitances therewith;
third means electrically interconnecting the first and second electrodes to establish a common measuring potential; and
fourth means for deriving a measuring voltage value between the third means and the first means.
4. A capacitive probe comprising:
a pair of similar shaped capacitor plates;
handle means for mounting and positioning the capacitor plates in a first plane parallel position and in a second position in which the capacitor plates are separated by a distance larger than they are in the first position, the pair of plates being insulated from the handle, the handle means further including means for defining a particular distance of the plates from each other and retaining a portion of a cable in between the pair of plates when in the first position, while permitting removal of the cable when the plates are in the second position;
means in the handle means for electrically interconnecting the two capacitor plates; and
means for deriving a measuring voltage from between the handle means and the pair of capacitor plates as interconnected by the interconnecting means.
5. A capacitive probe comprising:
a first T-shaped handle and a second T-shaped handle, each handle having a stem portion and a cross bar portion;
means for pivotally connecting the handles in their respective stem portions, the pivot axis being parallel to the two cross bar portions;
a pair of flat electrodes respectively mounted to the cross bar portions and facing each other, the electrodes being insulated from the handles;
means extending from at least one of the cross bar portions of at least one of the handles towards the cross bar portion of the respective other handle for engagement therewith to define a particular distance of the electrodes from each other, the electrodes when having such distance being in a plane parallel position to each other;
means electrically interconnecting the pair of electrodes; and an output cable having two conductors, one conductor connected to assume the potential of the two handles and the other one to assume the potential representative of the potential of the two electrodes.

6. A capacitive probe comprising:

a first element and a second element connected for pivot motion and having portions defining a cavity, the portions further defining two registering windows so that a cable can run through the cavity via the windows, the volume of the cavity being variable upon pivoting of the first and second elements permitting additionally insertion of a cable into the cavity other than through the windows;

a first and a second flat capacitor electrode in the cavity respectively attached to the first and second elements but insulated therefrom so that a cable when in the cavity extends in between the electrodes;

means in the first and second elements to define a predetermined particular position of the first and the second capacitor plates from each other;

means electrically interconnecting the electrodes;

and a pair of output conductors, one being connected to the two electrically interconnected electrodes and the other one being connected to assume the potential of the first and second elements.

7. A capacitive probe comprising:

a capacitor electrode;

means for supporting the electrode in relation to a cable, there being insulation interposed between the supporting means and the electrode resulting in a residual capacitance between the supporting means and electrode, the capacitor electrode together with the cable defining a particular capacitance;

a capacitor mounted to the supporting means and connected electrically between the supporting means and the electrode to provide a capacitive load between the electrode and the supporting means; and cable means for deriving a measuring voltage from across the capacitive load for applying the said voltage to a remotely positioned instrument.

8. A capactive probe for attachment to an electrical cable having a conductor and possibly having insulation around the conductor, comprising:

a pair of electrodes;

a pair of supporting elements for the electrodes, there being insulating means for respectively mounting the electrodes to the supporting elements in an insulated relationship thereto, the pair of mounting elements being mounted to each other to selectively assume a first and a second position, the elements having position defining means for positioning the electrodes in the first position in a particular distance from each other independently from the outer thickness of the cable, thereby defining a cavity in between, in the second position of the elements the electrodes are spaced apart by a distance from each other larger than in the first position;

means including the positioning means on the supporting elements for providing for the retaining of the cable in between the electrodes when the supporting elements are in the first position, while permitting removal of the cable from the retained position when the supporting elements are in the second position;

a layer of dielectric material having a high dielectric constant on each of the electrodes affixed thereto and to be interposed between the electrodes and the cable, to render the effective capacitances between each of the electrodes and the conductor essentially independent from an insulation of the cable; and means for deriving a common measuring potential from the two electrodes relative to a reference potential.

References Cited

UNITED STATES PATENTS

| | | | |
|---|---|---|---|
| 3,068,409 | 1/1969 | Bigliano et al. | 324—111 |
| 2,468,125 | 4/1949 | Silver | 324—126 XR |
| 2,604,512 | 7/1952 | Bacon et al. | 324—61 |
| 2,613,345 | 10/1952 | Osterland | 324—126 XR |
| 2,892,152 | 6/1959 | Buisson | 324—61 |

FOREIGN PATENTS 1,148,015  5/1963  Germany.

ALFRED E. SMITH, Primary Examiner

U.S. Cl. X.R.

324—72.5